(No Model.)

E. N. BLISS & J. F. MIDDLETON.
CAMERA SHUTTER.

No. 386,449. Patented July 24, 1888.

WITNESSES:
Wm. N. Rosenbaum
G. N. Stockbridge

INVENTOR:
Edward N. Bliss.
James F. Middleton.
BY W. J. Johnston
ATTORNEY.

N. PETERS, Photo-Lithographer, Washington, D. C.

UNITED STATES PATENT OFFICE.

EDWARD N. BLISS AND JAMES F. MIDDLETON, OF NEWARK, NEW JERSEY.

CAMERA-SHUTTER.

SPECIFICATION forming part of Letters Patent No. 386,449, dated July 24, 1888.

Application filed June 28, 1887. Serial No. 242,757. (No model.)

*To all whom it may concern:*

Be it known that we, EDWARD N. BLISS and JAMES F. MIDDLETON, citizens of the United States, residing in Newark, in the county of Essex and State of New Jersey, have invented certain new and useful Improvements in Camera-Shutters; and we do hereby declare that the following is a full, clear, and exact description of our invention, such as will enable others skilled in the art to which it appertains to make and use the same.

Our invention has reference to camera-shutters for photographic purposes. It is designed for use in the "instantaneous process" of photography; and its object is to provide a shutter which may be conveniently adjusted to make any desired length of exposure. To this end we construct our shutter of a pair of disks mounted on a common shaft and provided with semicircular registering slots or openings, the disks being rotatively adjustable on the shaft with relation to each other, so as to alter the length of the opening.

Figure 1:
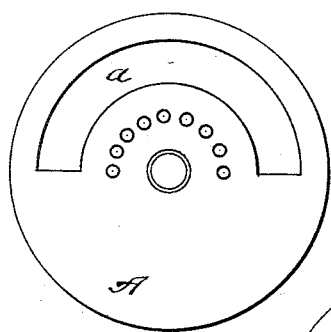
Figure 2:
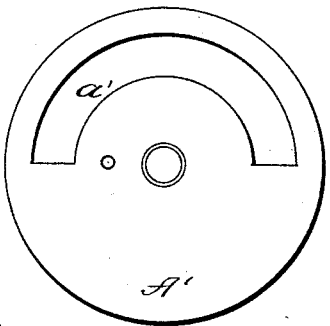
Figure 3:
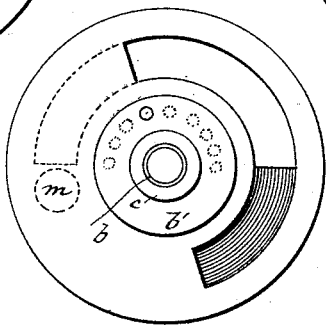
Figure 4:
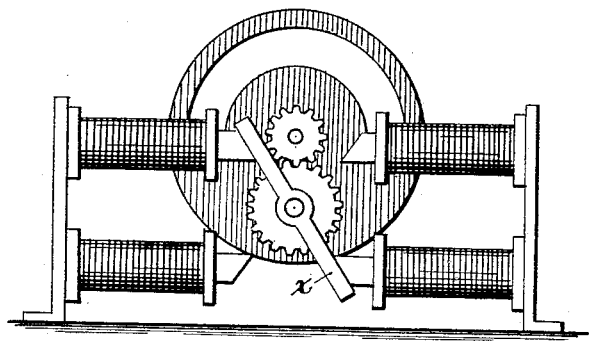
Figure 5:
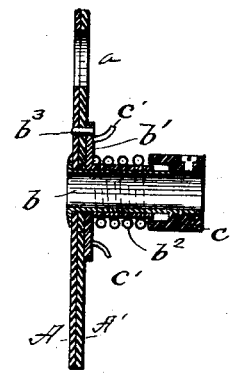

Referring to the accompanying drawings, Figures 1 and 2 represent face views of the two disks; Fig. 3, a face view of the disks placed together, illustrating an adjustment of the opening; Fig. 4, the disks geared to an electro-magnetic motor. The parts in this figure are only conventionally arranged to show one mechanism for rotating the shutter, and Fig. 5 is a sectional view of the disks and devices for connecting and adjusting them.

Referring to the drawings by letter, A and A' represent the two disks. They are of equal size and provided with slots $a$ $a'$, which are also of equal size and form semi-circles around the centers of the disks. Disk A also has a series of perforations arranged on a circle around the center, and disk A' a single perforation arranged to register with any of the perforations in A.

Both disks are mounted on a tube or shaft, $b$, the disk A being rigidly secured thereto and A' being mounted loosely. A flanged sleeve, $b'$, is slipped loosely over the shaft, a coiled spring, $b^2$, also slipped over the sleeve, and both are held in place by a retaining-nut, $c$, which is cut away internally to allow the sleeve to slide into it against the pressure of the spring. The flange of the sleeve $b'$ carries an inwardly-projecting pin, $b^3$, which is adapted to pass into the hole in disk A', and any one of the holes of disk A, to lock the disks together. Thumb-pieces or ears $c'$ are attached to the flanged sleeve to enable the operator to draw the sleeve and its pin back to unlock the disks. The loose disk may then be rotated the proper degree to present the length of opening desired, and the sleeve is allowed to move back, so that the pin enters the registering-holes and locks the disks together as one piece.

The tube or shaft $b$ may be connected or geared to any suitable motor-shaft. As an illustration, I have shown it connected with the shaft of an electric motor. In this motor the armature $x$ is vibrated at will, which causes a rotation of the shutter.

The shutter is to be located in front of the camera-opening, as shown in Fig. 3, in which the opening is represented by $m$. It will be seen by this figure that a rotation of the shutter will cause an exposure of the opening during the time the open slot is presented. The more nearly the slots $a$ $a'$ coincide the longer will be the exposure. By different adjustments the length of exposure may be varied from this maximum to a very slight exposure when the slots register only through a minute portion of their extent. The variation can be effected by an operator with great ease.

This apparatus is susceptible of a double adjustment—one by altering the length of the slot and one by varying the speed of the motor. In the present instance the latter adjustment can be effected by increasing or decreasing the strength of the battery by which the electromotor is operated.

What we claim is—

1. A photographic-camera shutter consisting of two rotary disks having a common axis and provided with corresponding openings, one disk being fixed to the axis and the other being adjustable thereon.

2. A photographic-camera shutter consisting of two disks having a common axis and provided with openings or slots of the same dimensions and shape, one disk being fixed to the axis and the other being adjustable thereon.

3. A photographic-camera shutter consisting of two disks, one of which is rigidly mounted on the shaft and the other loosely mounted thereon, the said disks being provided with openings which may be adjusted to register with each other, in combination with mechanism, substantially as described, for adjusting the said disks and devices for locking them together as one piece.

4. A photographic-camera shutter consisting of two disks, one of which is rigidly mounted on a shaft and the other loosely mounted thereon, the said disks being provided with openings which may be adjusted to register with each other, in combination with mechanism, substantially as described, for adjusting the said disks to make the length of exposure required.

5. A camera-shutter consisting of a pair of disks having a common axis, one of the said disks being rigidly secured to the shaft and the other disk loosely mounted thereon, the rigid disk having a series of perforations and the loose disk a single perforation, in combination with a loose sleeve mounted on the shaft provided with a pin or stud which is adapted to pass the perforation in the disks and lock them together as one piece, as set forth.

6. The combination of a pair of disks provided with holes with a shaft, loose sleeve, spring, and a set-nut, all arranged as described.

In witness whereof we have hereunto signed our names in the presence of two subscribing witnesses.

EDWARD N. BLISS.
JAMES F. MIDDLETON.

Witnesses:
G. H. STOCKBRIDGE,
AUGUSTUS MERRITT.